United States Patent [19]

Baca et al.

[11] Patent Number: 5,629,813

[45] Date of Patent: May 13, 1997

[54] INITIALIZATION AND CALIBRATION OF MAGNETIC TAPE HAVING MULTIPLE SERVO AREAS

[75] Inventors: Robert C. Baca; Alex Chliwnyj; Wayne T. Comeaux; James F. Crossland; Ronald K. Rhodes, all of Tucson, Ariz.

[73] Assignee: International Business Machines Corporation, Armonk, N.Y.

[21] Appl. No.: 406,277

[22] Filed: Mar. 16, 1995

Related U.S. Application Data

[63] Continuation of Ser. No. 77,471, Jun. 14, 1993, abandoned.

[51] Int. Cl.$^6$ ............................................. G11B 5/584
[52] U.S. Cl. ............................... 360/77.12; 360/78.02
[58] Field of Search ........................... 360/77.12, 77.04, 360/78.13, 77.05, 78.02

[56] References Cited

U.S. PATENT DOCUMENTS

| | | | |
|---|---|---|---|
| 4,055,849 | 10/1977 | Hickok | 360/77.13 |
| 4,297,737 | 10/1981 | Andersen et al. | 360/135 |
| 4,594,620 | 6/1986 | Shoji et al. | 360/75 |
| 5,050,017 | 9/1991 | Carr et al. | 360/77.12 |
| 5,053,897 | 10/1991 | Ikeshita | 360/77.04 X |
| 5,055,951 | 10/1991 | Behr | 360/77.12 |
| 5,068,757 | 11/1991 | Hughes et al. | 360/77.13 |
| 5,073,835 | 12/1991 | Sano et al. | 360/77.04 |
| 5,101,309 | 3/1992 | Mitsuhashi | 360/68 |
| 5,109,306 | 4/1992 | Mase et al. | 360/77.04 |
| 5,196,969 | 3/1993 | Iwamatsu | 360/78.02 X |
| 5,224,643 | 7/1993 | Kojima et al. | 360/71 X |
| 5,229,895 | 7/1993 | Schwarz et al. | 360/77.12 |
| 5,262,908 | 11/1993 | Iwamatsu et al. | 360/77.12 |
| 5,321,564 | 6/1994 | Takahashi et al. | 360/77.04 |
| 5,379,165 | 1/1995 | Pahr | 360/77.12 X |

FOREIGN PATENT DOCUMENTS 0508366  4/1992  European Pat. Off. .

OTHER PUBLICATIONS

T. A. Schwarz, "Compensation for Element-to-Element Misregistration in a Dual Element Head," IBM TDB vol. 17, No. 1, pp. 217–218, Jun. 1974.

*Primary Examiner*—Aristotelis Psitos
*Assistant Examiner*—James L. Habermehl
*Attorney, Agent, or Firm*—D. A. Shifrin

[57] ABSTRACT

The present invention provides an apparatus and method for initializing a magnetic tape when it is mounted in a tape drive. In one embodiment, each time a tape is mounted, control parameters pertaining to the servo system are set to predetermined values and servo read elements in the tape head are activated. The tape is moved and a number of position error signal (PES) samples are read and averaged for each of the active servo elements. The value of one or more of the parameters is modified and new PES readings and averages are obtained. This process is repeated for a predetermined combination of parameter values whereupon read and write offsets are calculated and stored for each servo element. During an actual read (or write) operation, the tape head is positioned relative to the data tracks on which the desired data is located and servo control enabled. An actual PES generated by each active servo element is adjusted by the read (or write) offset calculated for that servo element, thereby substantially canceling the effects of element-to-element, module-to-module and azimuthal deviations. The resulting adjusted PES is used by the servo controller to optimize track following.

8 Claims, 7 Drawing Sheets

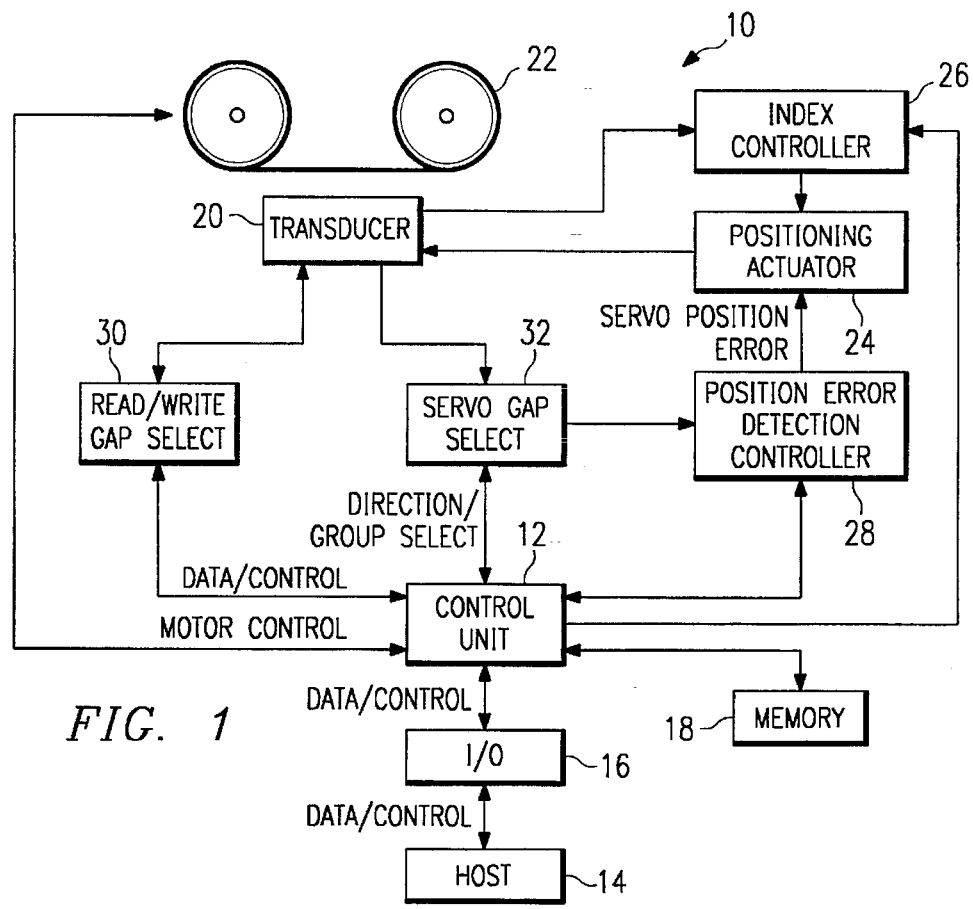
FIG. 1
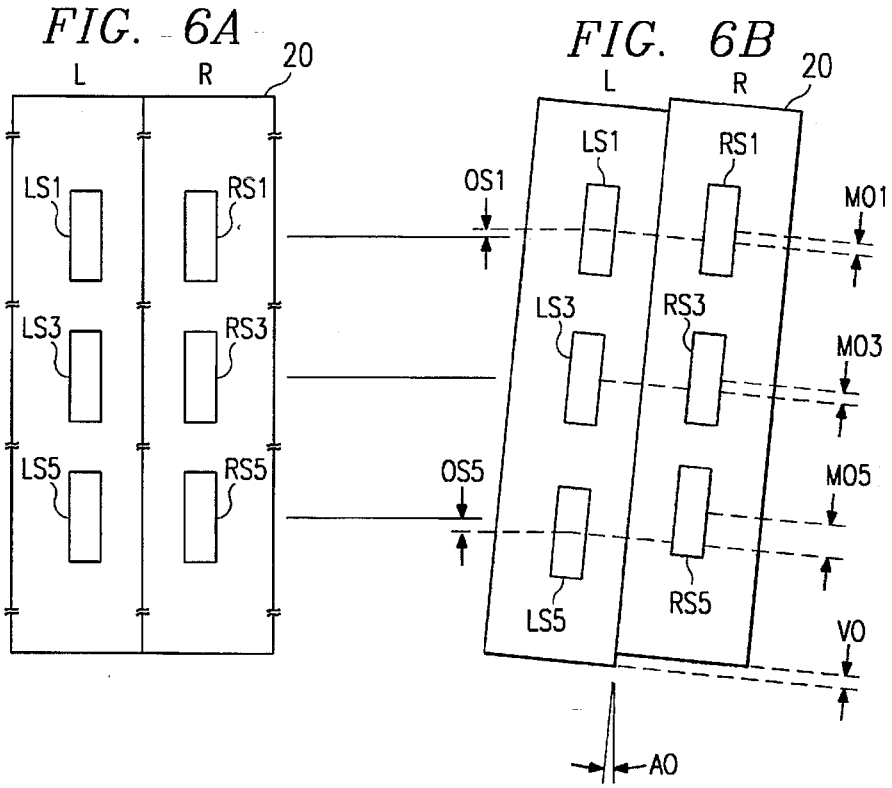
FIG. 6A
FIG. 6B

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR |
| SERVO | LS1 | RS1 |
| SERVO | LS2 | RS2 |
| 9 | WR | RD |
| 10 | RD | WR |
| 11 | WR | RD |
| 12 | RD | WR |
| 13 | WR | RD |
| 14 | RD | WR |
| 15 | WR | RD |
| 16 | RD | WR |
| SERVO | LS3 | RS3 |
| SERVO | LS4 | RS4 |
| 17 | WR | RD |
| 18 | RD | WR |
| 19 | WR | RD |
| 20 | RD | WR |
| 21 | WR | RD |
| 22 | RD | WR |
| 23 | WR | RD |
| 24 | RD | WR |
| SERVO | LS5 | RS5 |
| SERVO | LS6 | RS6 |
| 25 | WR | RD |
| 26 | RD | WR |
| 27 | WR | RD |
| 28 | RD | WR |
| 29 | WR | RD |
| 30 | RD | WR |
| 31 | WR | RD |
| 32 | RD | WR |

*FIG. 3*

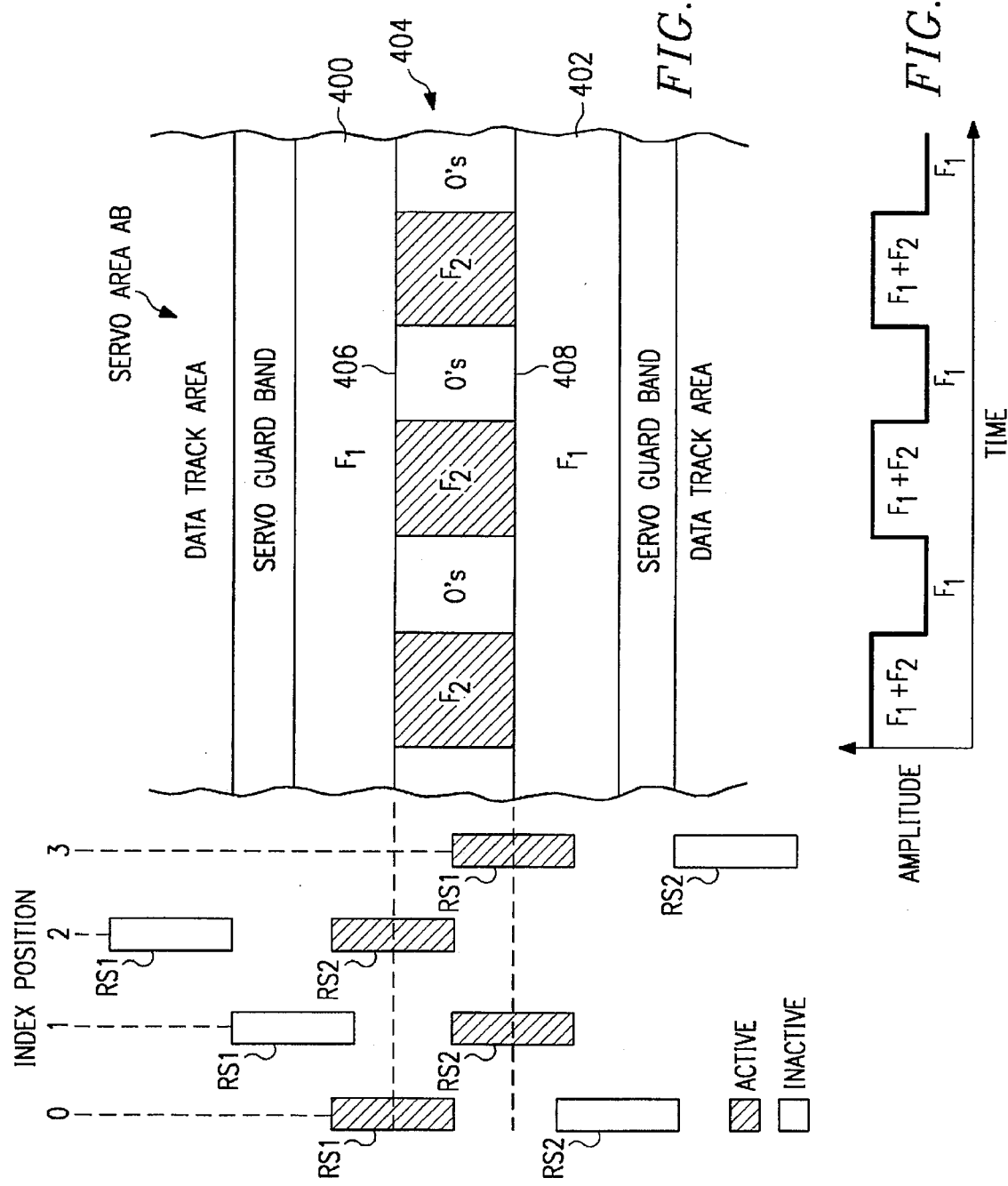

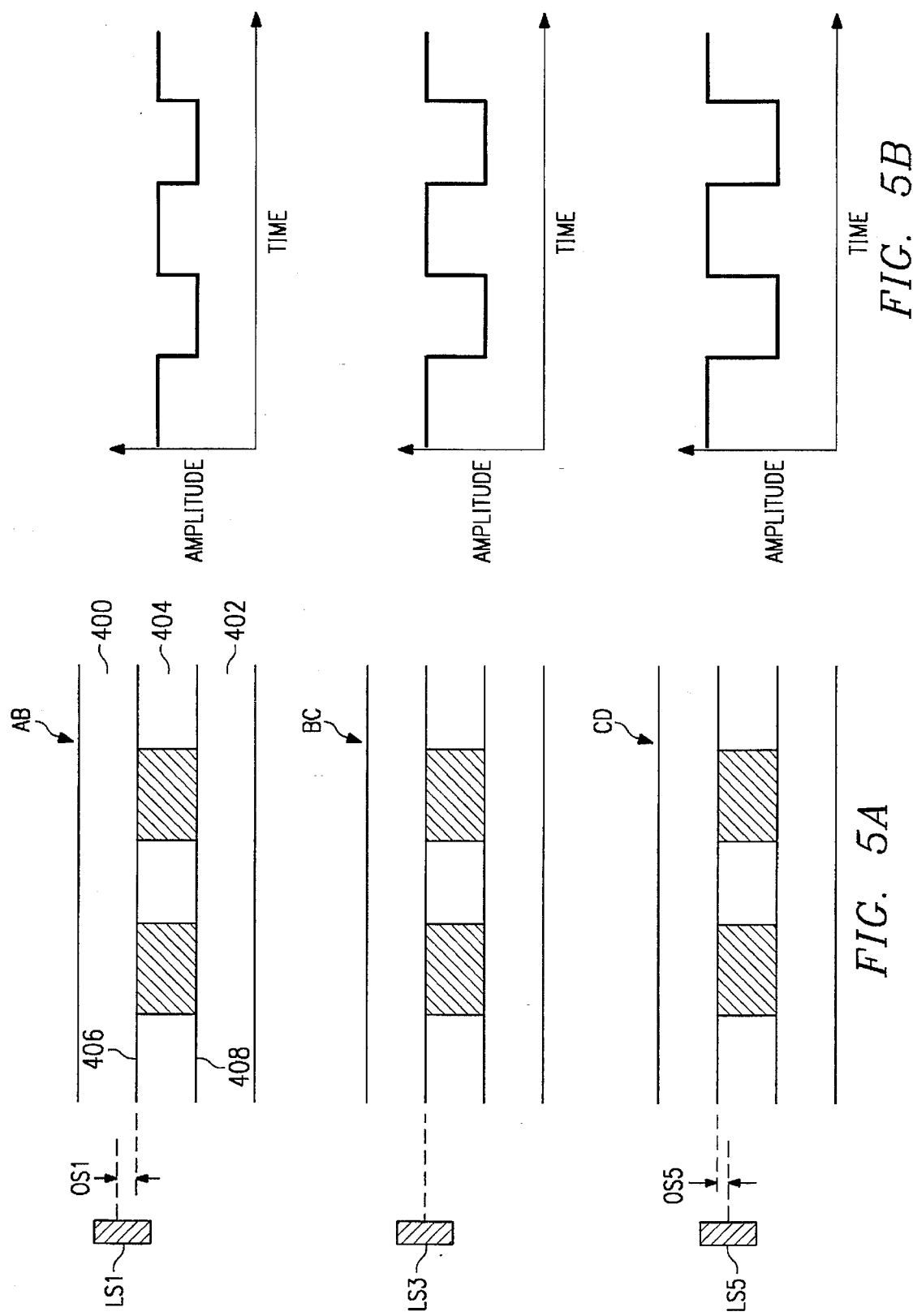

INITIALIZATION AND CALIBRATION OF MAGNETIC TAPE HAVING MULTIPLE SERVO AREAS

The application is a continuation of application Ser. No. 08/077,471, filed Jun. 14, 1993, now abandoned.

TECHNICAL FIELD OF THE INVENTION

The present invention relates to magnetic tape data storage, and in particular, to initialization of a servo positioning device upon mounting a magnetic tape cartridge.

BACKGROUND OF THE INVENTION

In the information storage industry, increases in the data capacity of tape have been achieved with thinner tape substrates and with various data compression techniques. Advances in the magnetic tape media and tape head technologies have generated further increases in data capacity by increasing both the number of tracks on a magnetic tape (by narrowing the width of each track) and the number of data read/write "gaps" or elements on the head. For example, the IBM 3490-E magnetic tape subsystem for 12.7 mm (½ inch) wide tape employs a head with 36 data read/write elements and has a tape capacity of about 800 megabytes (MB). 3490-E tape drives perform serpentine (bi-directional) linear (as opposed to helical scan) recording and, to reduce the number of tape rewinds and thereby improve performance, sets of data head elements are interleaved. In an interleaved head, element pairs having a read-element/write-element configuration (when viewed toward the face of the head) alternate with element pairs having an opposite, write-element/read-element configuration, each pair of elements being associated with one track on the tape. When the tape travels in one direction, the element pairs having one configuration access the associated tracks (such as the even numbered tracks) in a read-after-write manner and when the tape travels in the opposite direction, the element pairs having the other configuration access the other associated tracks (the odd numbered tracks), also in a read-after-write manner. To further enhance performance with such a large number of tracks requiring an equally large number of closely spaced elements, a magneto-resistive transducer formed through thin film deposition techniques can be employed as the tape head.

However, the number of parallel, longitudinal tracks which can be established on tape media has been limited by the number of read/write elements which could be fabricated on a head to write/read narrower tracks. Therefore, data tape drives have been designed to process a tape using a head having fewer sets of read/write elements than there are tracks on the tape. The tracks are divided into groups, each containing the same number of tracks as there are read/write element pairs in the head. To access all of the groups, the head is indexed transversely relative to the tape width, such as with a stepper motor or voice coil driven springs, into a number of discrete positions corresponding to the number of groups of tracks. For example, a head having eight read/write pairs can accommodate a tape having 24 tracks if the tracks are divided into three groups of eight tracks each and the head has three index positions. To reduce the distance the head travels between index positions, the groups are preferably interleaved. In the preceding example, each of three groups contained eight tracks. If tracks are numbered consecutively (0–23), group interleaving results in tracks 0, 3, 6, . . . , and 21 being in the first group and accessible by the head being indexed to position 0. Similarly, tracks 1, 4, 7, . . . and 22 are in the second group, accessible in index position 1, while tracks 2, 5, 8, 23 are in the third group, accessible in index position 2. Serpentine recording techniques can also be employed to improve access efficiency.

Despite such advances in data capacity, still further increases are desired, such as would be possible with a 12.7 mm wide tape having 64 or even 128 tracks. However, even when a head is indexed, there is a practical limit to the ability of a multi-track head to accurately and reliably record data to and read data from a tape having such a large number of very narrow tracks. Problems can be caused by track misregistrations, such as tape edge variations, environmental thermal expansion and contraction and inaccuracies in the path the tape follows in a drive, by inaccuracies in the formatting of tracks on the tape itself and by dimensional and spacing deviations during the manufacturing of the head. It can be appreciated that even a minute "wobble" in the tape or a misalignment in the head can result in significant signal degradation, such as crosstalk and dropout, if a 12.7 mm tape has 128 tracks, each with a width of about 80 microns.

Consequently, a tape head actuator has been developed which is capable of indexing a tape head to one of several positions during track seek operations. For example, to access a tape having 128 data tracks, a head having thirty-two read/write elements on the head indexes among four positions. Moreover, the head actuator is also capable of rapidly adjusting the position of the head under servo control to precisely follow a set of tracks during read and write operations. In a drive employing such actuator, the tape head has servo read elements or gaps for reading servo signals previously recorded onto one or more specially recorded servo tracks. Each servo element generates a position error signal (PES) which is employed by a position servo loop to determine the transverse position of the servo elements relative to the servo tracks. The loop then transmits a signal to the head actuator to rapidly move the head by very small amounts as necessary to enable precise track following.

To improve the accuracy with which the servo loop operates, the tape can have two or more servo areas, comprising a set of one or more servo tracks, spaced across the width of the tape; the tape head has a corresponding number of sets of servo elements. The PES's generated by the servo elements are concurrently read and averaged. The head position is maintained by the servo loop in response to the average, rather than the PES from any one servo element. Such redundancy makes the servo loop less susceptible to error or failure due to an error or failure by any one servo element. One such system includes three symmetrically spaced servo areas, each having three adjacent servo tracks, parallel to the data tracks. In each servo area, servo signals are recorded on the outer two (upper and lower) servo tracks at one frequency while servo signals are recorded on the middle servo track at a different frequency.

To provide for four head index positions, each set of servo elements has transversely spaced upper and lower servo elements, one of which is active at one time. During indexing, either the upper or lower servo element of each set of servo elements is positioned opposite the upper or lower boundary or edge between the middle servo track and the upper or lower servo track. Then, during data access, the servo loop attempts to maintain the magnetic center of the active servo elements in alignment with the selected upper or lower edge in the respective servo areas. It will be appreciated that the combination of two groups of servo elements (upper and lower) and two servo edges (upper and lower) makes the four index positions available and that other combinations provide other numbers of index positions.

If all of the servo elements are perfectly formed on the tape head, both in size and in position relative to each other servo element, all active servo elements will be maintained centered over the desired servo area edge within the accuracy of the servo control system and the average of the PES's generated by the active servo elements should be substantially the same as the PES of any individual PES. The advantage of employing redundant servo areas is apparent if one of the servo elements becomes disabled: accurate servo positioning can still be maintained. However, such manufacturing precision cannot be economically achieved in commercial quantities and the servo elements can have slight dimensional and spacing deviations whereby their magnetic centers are not perfectly aligned with each other or with the servo areas of the tape. Consequently, when one servo element is centered on the desired servo edge, the other servo elements in the group will likely not be centered. Consequently, use of an average PES may not result in any servo element being centered on the servo area edge, leading to potential mistracking and read and write errors, such as overwriting onto adjacent data tracks. Discrepancies of this nature are referred to as element-to-element offsets.

As previously noted, data is accessed (written, read or erased) by element pairs comprising spaced apart read and write elements. One type of tape head is formed with left and right modules on which are located the data elements; the read element of one pair is formed on one module and the associated write element is formed on the other module. The servo elements on such a tape head are also paired, left and right. The right servo elements are enabled when the tape is travelling in a forward direction; the left servo elements are enabled when the tape is travelling in the reverse or backward direction. However, because the two modules may not be perfectly manufactured or bonded to each other, module-to-module discrepancies or offsets can occur, resulting in mistracking and additional read and write errors. Moreover, the head itself may be slightly angularly misaligned, leading to an azimuthal offset. Finally, because the servo areas of each tape may not be perfectly aligned and recorded, they may vary from one tape to the next. Therefore, different combinations of tape and tape drives can result in different degrees of read and write errors from the aforementioned discrepancies.

OBJECTS AND SUMMARY OF THE INVENTION

In view of the foregoing, it is an object of the present invention to provide a tape drive with precise servo following despite the presence of any of the aforementioned discrepancies.

This and other objects are achieved in this invention by providing an apparatus and method for initializing a magnetic tape drive when a tape cartridge is mounted in a tape drive. In one embodiment of the method of the present invention, control parameters pertaining to the servo system are set to predetermined values each time a tape is mounted and servo read elements in the tape head are activated. The tape is moved and a number of position error signal (PES) samples are read and averaged for each of the active servo elements. The value of one or more of the parameters is modified and new PES readings and averages are obtained. This process is repeated for a predetermined combination of parameter values whereupon a read offset is calculated for each servo element. A write offset can also be calculated for each servo element.

Upon completion of initialization, the system is ready for normal read and write operations. To perform a read (or write), the tape head is positioned relative to the data tracks on which the desired data is located and servo control is enabled. The actual PES generated by each active servo element is adjusted by the read (or write) offset calculated for that servo element, thereby substantially canceling the effects of element-to-element, module-to-module and azimuthal deviations. The resulting adjusted PES is used by the servo controller to optimize track following.

The foregoing and other features and advantages of the invention will be apparent from the following more particular description of preferred embodiments of the invention, as illustrated in the accompanying drawings.

BRIEF DESCRIPTION OF THE DRAWINGS

FIG. 1 is a block diagram of a magnetic tape system employing the present invention;

FIG. 3 illustrates the configuration of data and servo elements on a magnetic tape transducer used to access the tape of FIG. 2;

FIGS. 4A and 4B illustrate the transducer of FIG. 3 positioned to access data from the tape of FIG. 2 and an exemplary PES generated by a servo element;

FIG. 5A and 5B illustrate element-to-element discrepancies in the transducer of FIG. 3 and resulting PES plots;

FIGS. 6A and 6B illustrate element-to-element, module-to-module and azimuthal deviations in the transducer of FIG. 3.

RELATED APPLICATIONS

Figure 2:
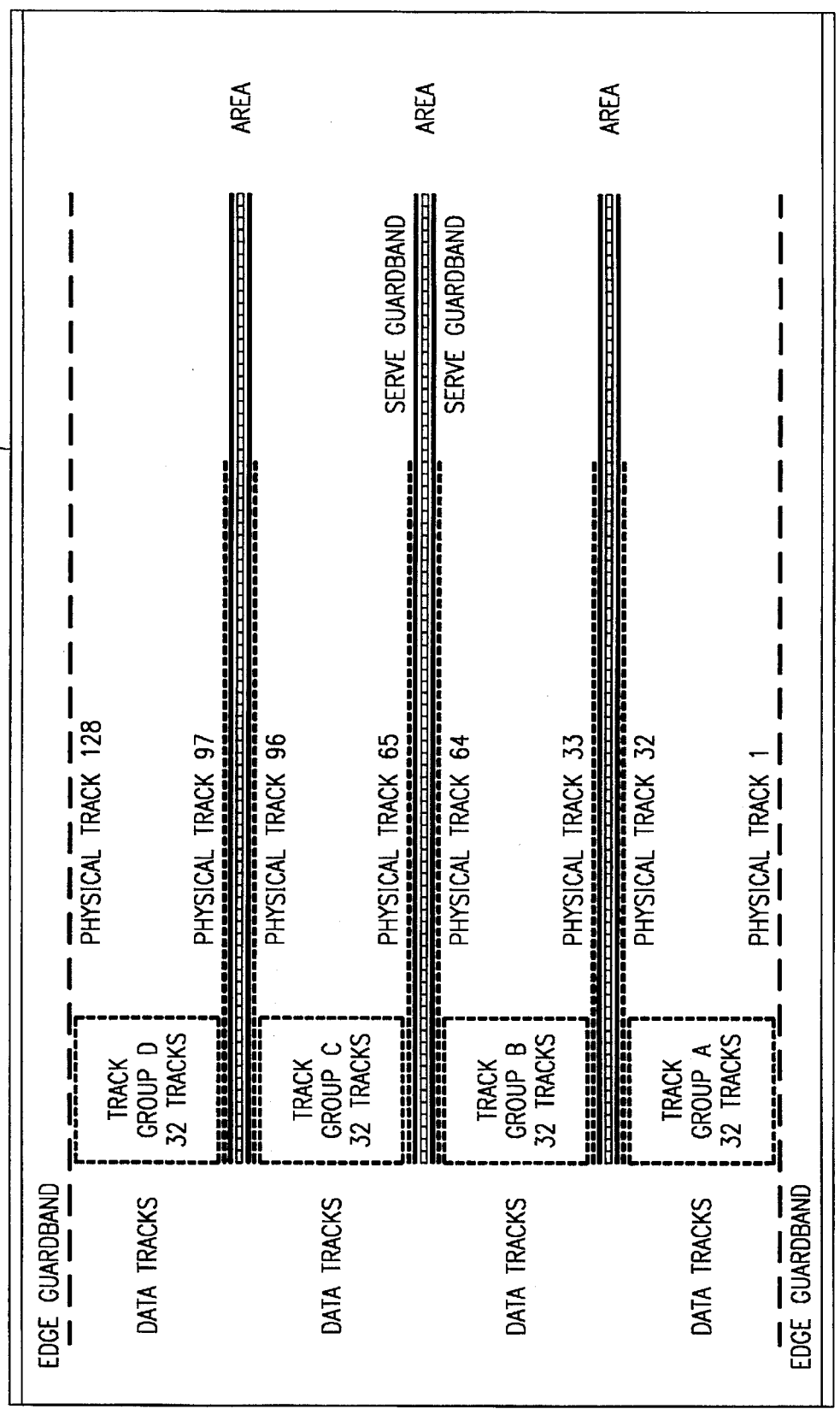
FIG. 2 illustrates a magnetic tape format employable with the present invention.

This application is related to the following copending U.S. patent applications, all having a common assignee and filing date with this application: Ser. No. 08/075,624, entitled PROCESSING SERVO SIGNALS CONCURRENTLY READ FROM PLURAL SPACED-APART SERVO AREAS FOR MAGNETIC TAPE HAVING SERPENTINE DATA TRACK SCANNING by Baca et al. and Ser. No. 08/075,937, entitled ACTUATOR ASSEMBLY FOR SERVO-CONTROLLED MAGNETIC TAPE HEAD by Hu et al.

DETAILED DESCRIPTION OF THE INVENTION

FIG. 1 is a block diagram of a magnetic tape system 10 of the present invention. The system 10 includes a control unit 12 to and from which data and control signals are transmitted from and to a host device 14 through an interface 16. The control unit 12 is interconnected with a memory device 18, such as random access memory, for storage of, among others, calibration information as later described herein. A magnetic tape head 20, preferably a thin-film magneto-resistive transducer, includes both data read/write elements to record and read data onto and from a tape 22, and servo read elements to read servo signals recorded on the tape 22. The control unit 12 is interconnected with tape reel motors and tachometers to control the direction, velocity and acceleration of the tape 22. A positioning actuator 24 directs the motion of the transducer 20 in a transverse direction relative to the tape width. When the transducer 20 is to be moved to a selected index position, an index controller 26 is enabled by the control unit 12 and transmits an appropriate signal to the positioning actuator 24. Signals from a sensor, such as an optical tachometer adjacent the transducer 20, provide feedback to the index controller 26 to ensure satisfactory index positioning. Similarly, a position error controller 28 directs the positioning actuator 24 during servo controlled track following.

Depending upon the index position desired and the direction of the tape, different sets of read/write elements are enabled by a read/write gap select device 30 and different groups of servo elements are enabled by a servo gap select device 32, both under the direction of the control unit 12.

FIG. 2 illustrates a format of the magnetic tape 22 having four data track groups A, B, C and D, of thirty-two parallel data tracks each, and three parallel servo areas AB, BC and CD symmetrically spaced across the tape width between the four data track groups A–D. The data track groups A–D and the servo areas AB, BC and CD extend longitudinally the length of the tape 22. Guard bands are situated between the tape edges and the first and last data tracks and between the boundaries of each servo area AB, BC and CD and adjacent data tracks. As shown in more detail in FIG. 4A, each servo area includes two outer tracks 400 and 402, having a recorded servo pattern of one frequency, on either side of a middle track 404, having a different recorded servo pattern of a second frequency. FIG. 3 illustrates an element configuration of the transducer 20 operable with the 128 track tape 22 illustrated in FIG. 2. The length of the transducer 20 substantially corresponds to the width of the tape 22; the transducer 20 includes thirty-two read/write element pairs and three sets of servo read elements corresponding to the three servo areas AB, BC and CD. The transducer includes left and right modules separately fabricated, then bonded together. Write and read elements alternate transversely down the length of each module (that is, across the width of the tape), beginning with a write element in position one on the left module and a read element in the corresponding position one on the right module. Thus, each write element in the left module is paired with a read element in the corresponding position on the right module and each read element in the left module is paired with a write element in the corresponding position on the right module such that write/read element pairs alternate transversely with read/write element pairs.

Between data element positions 8 and 9, 16 and 17, and 24 and 25 are located two left and right pairs of servo read elements, identified as LS1 and RS1, LS2 and RS2, LS3 and RS3, LS4 and RS4, LS5 and RS5, and LS6 and RS6. For purposes of further identification, servo pairs 1, 3 and 5 are in an upper group while pairs 2, 4 and 6 are in a lower group.

In operation, as the tape 22 travels past the transducer 20 in one direction, forward, for example, the control unit 12 directs the index controller 26 to position the transducer 20 in a first desired index position. The sixteen odd-numbered data read/write element pairs are enabled and access data tracks 2, 10, 18, . . . , 114 and 122. The tape direction is reversed for a second pass, the first index position is maintained, and the sixteen even-numbered data elements are enabled to access data tracks 6, 14, 22, . . . , 118 and 126. For a third pass, the head is indexed to the next position, the tape moved forward, and the odd data elements enabled to access data tracks 3, 11, 19, . . . , 115 and 123. The entire tape can be accessed in such a fashion, sixteen tracks at a time, with a total of four index positions and eight passes, four in each direction.

To accomplish precise servo positioning of the transducer 20 during track following (read/write/erase) operations of the tape device 10, the control unit 12 directs the servo gap select device 32 to activate the upper or lower group of servo elements on the left or right module, depending upon the tape direction and the selected index position. FIG. 4A illustrates servo elements RS1 and RS2, of the upper and lower servo groups, respectively, on the right module of the transducer 20 in each of the four index positions of the transducer 20. For purposes of this illustration, the corresponding servo elements LS1 and LS2 on the left module are not shown. The active or selected element (upper or lower), shown with shading, is aligned with an upper edge 406 or lower edge 408 between the inner and outer tracks of the servo area AB. FIG. 4B is an amplitude vs time plot of an exemplary PES generated by an active element which is perfectly centered on the selected edge. The ratio of the minimum amplitude to the maximum amplitude indicates the position of the active element relative to the selected edge.

As illustrated in FIGS. 5A and 5B, any discrepancy in the location of the magnetic center of a servo element relative to the physical center of the element or to the edge of the servo area will affect the relative minimum/maximum amplitude ratio. Such discrepancies, referred to as an element-to-element offsets, can occur if the dimensions of each servo element are not exact, if the magnetic center of one or more servo element does not correspond with the physical center of the servo element, if the spacing between the servo elements of each group are not exact or if there is misregistration in the servo tracks recorded on the tape. Dimensions OS1 and OS5 with respect to elements LS1 and LS5, respectively, exemplify element-to-element offsets; element LS3 has no such offset.

Referring now to FIGS. 6A and 6B, the aforementioned element-to-element offsets can be compounded if the left and right modules of the transducer 20 are bonded together with a vertical offset VO or if the transducer 20 is mounted to the head actuator with an angular or azimuthal offset AO. FIG. 6A illustrates an ideal transducer with no element-to-element, module-to-module or azimuthal offsets while FIG. 6B illustrates a transducer having all three types of offsets. Offsets OS1 and OS5 again represent element-to-element offsets while MO1, MO3 and M05 represent combined azimuthal and module-to-module offsets. The offsets can be different for each tape cartridge, for each tape drive and for each cartridge/drive combination.

Figure 7A:
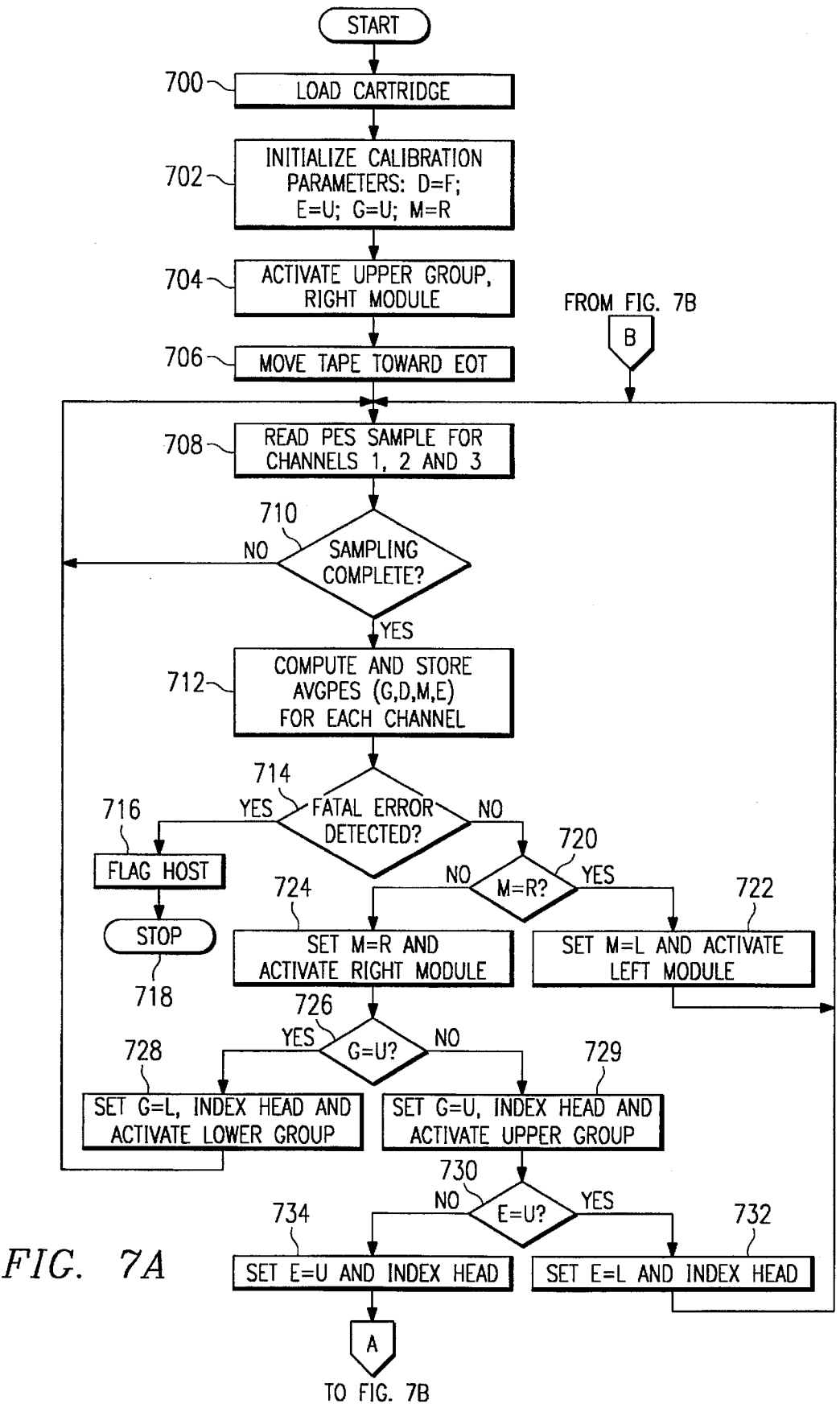
FIGS. 7A and 7B comprise a logic flow diagram of a method of the present invention.
Figure 7B:
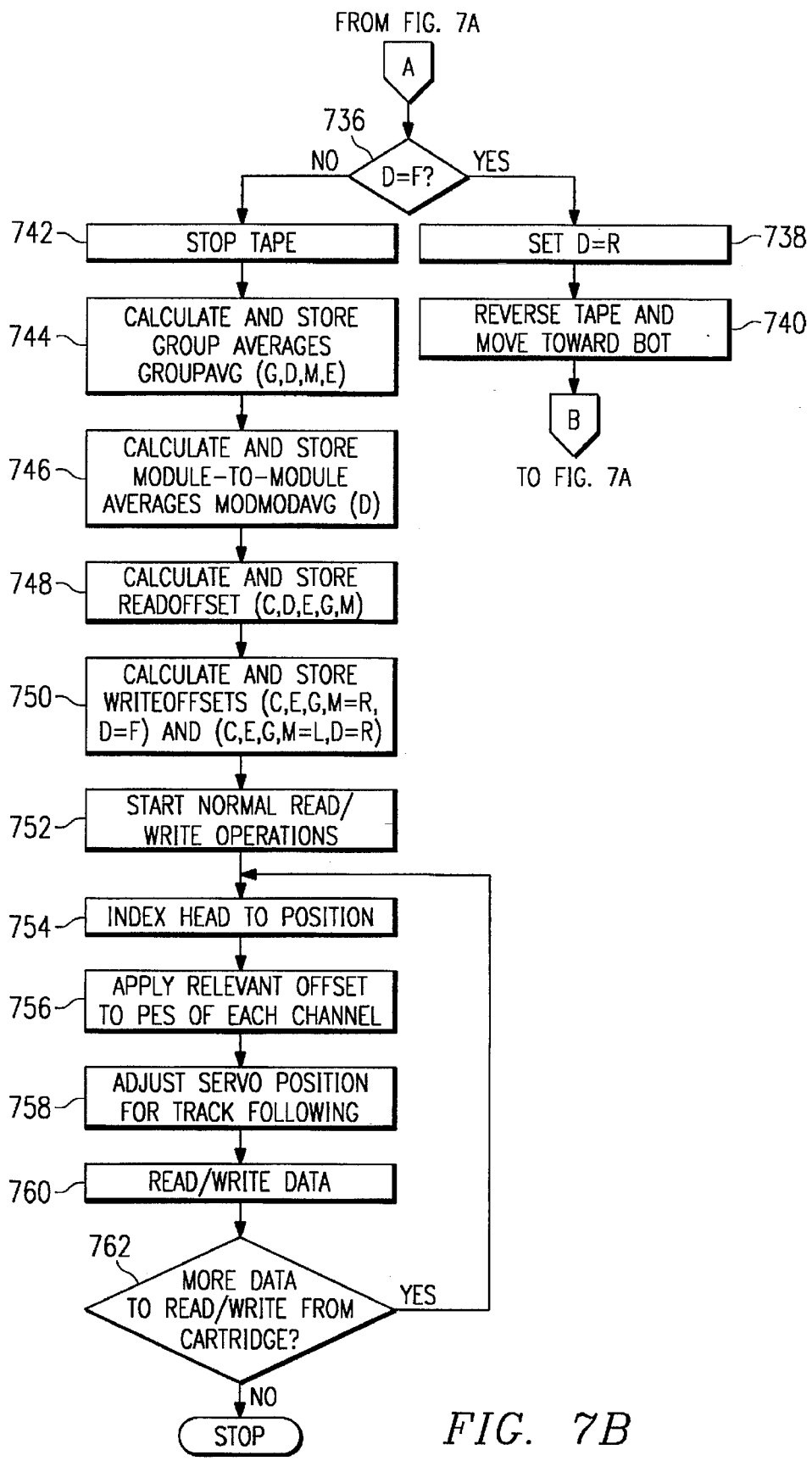

To enhance the accuracy with which a tape drive reads, and especially writes, information, the present invention provides for the calibration of a tape drive each time a tape cartridge is mounted in a tape drive. Referring to the flow chart of FIGS. 7A and 7B, a tape cartridge 22 is selected, manually or by an accessor in an automated storage and retrieval environment, and mounted in the drive 10 (Step 700). The control unit 12 initializes calibration parameters (Step 702) for the forward direction (D=F), upper servo area edge (E=U), upper servo element group (G=U) and right transducer module (M=R) and directs the servo gap select device 32 to select the upper servo element group of the right module (Step 704). The tape is then moved forward towards the end of the tape (Step 706). A number of PES samples, such as twenty, are read and processed (Steps 708 and 710) for the active servo elements by the control unit 12 and a separate average calculated for each element (Step 712). Each average is stored in the memory 18 along with the associated parameters D, E, G and M.

If, at any time during the calibration process, a fatal error is detected (Step 714), the host or operator is notified (Step 716) and the process halted (Step 718). For example, poorly written or missing servo tracks, excessive debris on the tape, significant tape guiding problems, and independent position sensor home positioning errors can be detected and flagged. Any of these errors could cause the overwriting of adjacent tracks if not detected.

After processing the first set of samples for the active elements (Step 720), M is set to L, the left module activated (Step 722) and another set of samples processed for these active elements (Steps 708–720), without changing the other parameters. Next, the module and group parameters M and G are set to R and L, respectively, the upper elements of the right module activated and the transducer indexed to a new position (Steps 724–728); another set of samples are then processed, the module switched to the left side, and still another set processed. These steps are then repeated for the lower servo edges (Steps 730–732).

After the foregoing eight sets of samples are obtained, the tape is stopped, all of the parameters except D reset to their original values, D set to R, the transducer indexed back to the first position, and the tape moved in the backward direction toward the beginning of the tape (Steps 734–740). Another set of eight PES samples are read, the averages stored and the tape, now at its beginning, stopped (Step 742). Table 1 summarizes the sixteen combinations of tape directions, servo area edges, servo element groups and module sides:

TABLE 1

| Tape Section | Tape Direction | Servo Edge | Servo Group | Transducer Module |
|---|---|---|---|---|
| 1 | forward | upper | upper | right |
| 2 | forward | upper | upper | left |
| 3 | forward | upper | lower | right |
| 4 | forward | upper | lower | left |
| 5 | forward | lower | upper | right |
| 6 | forward | lower | upper | left |
| 7 | forward | lower | lower | right |
| 8 | forward | lower | lower | left |
| 8 | backward | upper | upper | right |
| 7 | backward | upper | upper | left |
| 6 | backward | upper | lower | right |
| 5 | backward | upper | lower | left |
| 4 | backward | lower | upper | right |
| 3 | backward | lower | upper | left |
| 2 | backward | lower | lower | right |
| 1 | backward | lower | lower | left |

These sixteen sets result in sixteen PES averages, identified as AvgPES(C,D,E,G,M), where C is the servo channel corresponding to one of the three sets of four servo elements shown in FIG. 3. The control unit uses the AvgPES's to calculate and store a set of group averages (Step 744) indicative of element-to-element offsets:

$$GroupAvg(D,E,G,M) = (⅓)*\{AvgPES(1,D,E,G,M) + AvgPES(2,D,E,G,M) + AvgPES(3,D,E,G,M)\} \quad (Eq.\ 1)$$

and a set of module-to-module averages (Step 746) indicative of module-to-module offsets:

$$\begin{aligned}ModModAvg(D) = (1/4) * \\ \{GroupAvg(D,E = U,G = U,M = L) - \\ GroupAvg(D,E = U,G = U,M = R) + \\ GroupAvg(D,E = L,G = U,M = L) - \\ GroupAvg(D,E = L,G = U,M = R) + \\ GroupAvg(D,E = U,G = L,M = L) - \\ GroupAvg(D,E = U,G = L,M = R) + \\ GroupAvg(D,E = L,G = L,M = L) - \\ GroupAvg(D,E = L,G = L,M = R)\}\end{aligned} \quad (Eq.\ 2)$$

Finally, offsets to be applied to actual PES's during data read and write operations are calculated and stored in the memory 18 (Steps 748–750):

$$ReadOffset(C,D,E,G,M) = AvgPES(C,D,E,G,M) - GroupAvg(D,E,G,M) \quad (Eq.\ 3)$$

$$WriteOffset(C,D=F,E,G,M=R) = ReadOffset(C,D=F,E,G,M=R) - ModModAvg(F) \quad (Eq.\ 4)$$

$$WriteOffset(C,D=B,E,G,M=L) = ReadOffset(C,D=B,E,G,M=L) - ModModAvg(B) \quad (Eq.\ 5)$$

It is to be noted that other combinations of servo element groups, servo area edges and number of modules can be accommodated by the present invention and that no limitation is to be implied by the combinations described herein. For example, the invention can be employed with such combinations as: a single direction tape drive and single module transducer; a transducer having a single group of servo elements and a tape with two or more servo area edges; with a tape having a single servo area edge and a transducer having two or more groups of servo elements; and others.

Having calculated and stored the read and write offsets, the tape drive 10 is ready to perform normal read/write operations (Step 752). The control unit 12 receives a command from the host 14 to read or write data from or to a particular set of tracks on the tape 22 and directs the index controller 26 to move the transducer 20 to the index position necessary to access the desired tracks (Step 754). The control unit 12 also sends direction and group select commands to the servo gap select device 32 to activate (or accept signals from) the upper or lower group of servo elements of the right or left module corresponding to the tracks to be accessed.

To read or write data from or to the tape 22, the respective read or write offsets for each of the three selected servo elements are recovered by the control unit 12 from the memory 18 and the tape 22 begins to move in the appropriate direction. Each of the three active servo elements senses the servo patterns in the servo areas and generates an actual PES. Because of possible discrepancies, as previously described, one or more of the elements may not be centered on the servo area edges and an average of the PES's from all three elements may not provide satisfactory servo positioning. Consequently, the control unit 12 adds or subtracts the necessary ReadOffset or WriteOffset from each of the actual PES's to obtain adjusted PES's (Step 756) which are then averaged. Servo positioning is performed by the positioning actuator 24 on the basis of the average adjusted PES (Step 758), thereby maintaining a closer alignment of the three servo elements relative to the servo area edges during the track access (Step 760).

While the invention has been particularly shown and described with reference to preferred embodiments thereof, it will be understood by those skilled in the art that various changes in form and details may be made therein without departing from the spirit and scope of the invention.

What is claimed is:

1. An apparatus for initializing a bi-directional, multi-track magnetic tape drive having multiple, spaced-apart, longitudinal servo elements, comprising:

a magnetic tape head having left and right modules, each of said modules having an upper group of servo read elements vertically interleaved with a lower group of servo read elements, each of said upper and lower groups of each of said left and right modules having a number of servo elements corresponding to the number of servo areas on a removable magnetic tape, said servo elements of each of said upper and lower groups of said left module being horizontally aligned with corresponding servo elements of each of said upper and lower groups, respectively, of said right module, each said servo element capable of generating an unadjusted position error signal representative of a position of said servo element relative to a selected one of an upper edge and a lower edge of one of the servo areas on the tape;

servo control means for moving said head among a first plurality of index positions and, after moving said head to a desired one of said index positions, moving said head in small increments about said desired index position whereby a predetermined position of at least one of said servo elements in a selected one of said upper and lower groups of a selected one of said left and right modules follows a selected one of the upper and lower edges of a corresponding servo area during a tape access operation; and a control unit, interconnected with said tape head and said servo control means, for determining element-to-element, module-to-module and azmuthal offsets in each of said servo elements each time a magnetic tape is mounted in the tape drive and, during data read operations, for generating an adjusted position error signal for each active servo element during data read operations based upon the unadjusted position error signals and the determined offsets and directing said servo control means in accordance with the adjusted position error signals, said control unit comprising:

means for measuring individual average position error signals AvgPES(C,D,E,G,M) generated by said servo elements, where: C specifies a selected servo area; D specifies a selected direction of the tape; E specifies a selected servo area edge; G specifies a selected group; and M defines a selected module;

means for calculating group average position error signals GroupAvg(D,E,G,M) from the individual average position error signals;

means for calculating module-to-module average position error signals ModModAvg(D) from the group average position error signals;

means for calculating read offsets ReadOffset(C,D,E,G,M) from the individual average position error signals and the group average position error signals;

a first memory for storing the calculated read offsets for the mounted magnetic tape; and means for calculating an adjusted position error signal AdjPES(C,D,E,G,M) for each active servo element from measured position error signals and the stored read offsets during data read operations on the mounted magnetic tape.

2. The apparatus of claim 1, wherein each group average GroupAvg(D,E,G,M)=(1/n)*{AvgPES(1,D,E,G,M)+AvgPES(2,D,E,G,M)+ . . . +AvgPES(n,D,E,G,M)}, where n is the number of servo areas on the tape.

3. The apparatus of claim 1, wherein each module-to-module average

{GroupAvg(D,E = U,G = U,M = L) −
GroupAvg(D,E = U,G = U,M = R) +
GroupAvg(D,E = L,G = U,M = L) −
GroupAvg(D,E = L,G = U,M = R) +
GroupAvg(D,E = U,G = L,M = L) −
GroupAvg(D,E = U,G = L,M = R) +
GroupAvg(D,E = L,G = L,M = L) −
GroupAvg(D,E = L,G = L,M = R)}.

4. The apparatus of claim 1, wherein said means for calculating read offsets comprises means for calculating ReadOffset(C,D,E,G,M)=AvgPES(C,D,E,G,M) −GroupAvg(D,E,G,M).

5. The apparatus of claim 4, said control unit further comprising:

means for calculating write offsets WriteOffset(C,D=F,E,G,M=R)=ReadOffset(C,D=F,E,G,M=R)−ModModAvg(D=F) and WriteOffset(C,D=B,E,G,M=L)=ReadOffset(C,D=B,E,G,M=L)−ModModAvg(D=B) for the mounted magnetic tape;

a second memory for storing the calculated write offsets for the mounted magnetic tape;

means for calculating an adjusted position error signal AdjPES(C,D,E,G,M) for each active servo element from the unadjusted position error signals and the stored write offsets during data write operations on the mounted magnetic tape; and means for directing said servo control means in accordance with the adjusted position error signals during data write operations on the mounted magnetic tape.

6. A magnetic tape system comprising:

a deck for accepting a removable magnetic tape cartridge, the tape being wound on a supply reel within the cartridge and having a plurality of spaced-apart, longitudinal servo areas parallel to data tracks;

a magnetic tape transducer having left and right modules, each of said modules having an upper group of servo read elements vertically interleaved with a lower group of servo read elements, each of said upper and lower groups of each of said left and right modules having a number of servo elements corresponding to the number of servo areas on the tape said servo elements of each of said upper and lower groups of said left module being horizontally aligned with corresponding servo elements of each of said upper and lower groups, respectively, of said right module, each said servo element capable of generating an unadjusted position error signal representative of a position of said servo element relative to a selected one of an upper edge and a lower edge of one of the servo areas on the tape;

drive means for transporting the tape from the supply reel across said transducer to a takeup reel;

servo control means for moving said transducer in small increments about a desired index position whereby at least one servo element in a selected one of said upper and lower groups of servo elements maintains a predetermined alignment with the corresponding servo area during a tape access operation;

control means for obtaining a predetermined number of position error signals from each of said servo elements when the tape is mounted in said deck and determining an average thereof and for calculating a read offset for each of said servo elements from the determined position error signal averages, each read offset being indicative of dimensional and spacing variations of the associated servo element; and memory means for storing the read offsets for the mounted tape;

said servo control means comprising means for moving said tape head in small increments during data read operations with the mounted tape on the basis of the unadjusted position error signals and the read offsets.

7. The tape subsystem of claim 6, wherein said control means comprises:

means for determining individual average position errors AvgPES(C,D,G,E,M), where C is an integer from 1 to n, n being the number of sets of servo elements on said head;

means for calculating group average position errors
GroupAvg(D,E,G,M)=(1/n)*{AvgPES(1,D,E,G,M)+
AvgPES(2,D,E,G,M)+. . . +AvgPES(n,D,E,G,M)};

means for calculating module-to-module average position errors $$
\begin{aligned}
& \text{GroupAvg(D,E = U,G = U,M = R) +} \\
& \text{GroupAvg(D,E = L,G = U,M = L) -} \\
& \text{GroupAvg(D,E = L,G = U,M = R) +} \\
& \text{GroupAvg(D,E = U,G = L,M = L) -} \\
& \text{GroupAvg(D,E = U,G = L,M = R) +} \\
& \text{GroupAvg(D,E = L,G = L,M = L) -} \\
& \text{GroupAvg(D,E = L,G = L,M = R)};
\end{aligned}
$$

and means for calculating the read offsets ReadOffset(C,D,E,G,M)=AvgPES(C,D,E,G,M)−GroupAvg(D,E,G,M).

8. The tape subsystem of claim 7, wherein said control means further comprises:

means for calculating a first write offset WriteOffset(C,D=F,E,G,M=R)=ReadOffset(C,D=F,E,G,M=R)−ModModAvg(D=F); and means for calculating a second write offset WriteOffset(C,D=B,E,G,M=L)=ReadOffset(C,D=B,E,G,M=L)−ModModAvg(D=B).

\* \* \* \* \*